(12) United States Patent
LoPresto et al.

(10) Patent No.: US 12,325,524 B2
(45) Date of Patent: Jun. 10, 2025

(54) ADJUSTABLE ICE PROTECTION SYSTEM PARTING STRIP

(71) Applicant: Goodrich Corporation, Charlotte, NC (US)

(72) Inventors: Vincent R. LoPresto, Eagan, MN (US); Galdemir Cezar Botura, Copley, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/601,353

(22) Filed: Mar. 11, 2024

(65) Prior Publication Data

US 2024/0217664 A1 Jul. 4, 2024

Related U.S. Application Data

(63) Continuation of application No. 17/537,611, filed on Nov. 30, 2021, now Pat. No. 11,926,425.

(51) Int. Cl.
*B64D 15/14* (2006.01)
*B64D 15/20* (2006.01)

(52) U.S. Cl.
CPC ............ *B64D 15/14* (2013.01); *B64D 15/20* (2013.01)

(58) Field of Classification Search
CPC ......... B64D 15/14; B64D 15/20; B64D 15/22
See application file for complete search history.

(56) References Cited

U.S. PATENT DOCUMENTS

| 5,351,918 A | 10/1994 | Giamati et al. |
| 6,237,874 B1 | 5/2001 | Rutherford et al. |
| 7,246,773 B2 | 7/2007 | Stoner et al. |
| 7,938,368 B2 | 5/2011 | Hogate |
| 2008/0029648 A1 | 2/2008 | Giamati |
| 2010/0243811 A1 | 9/2010 | Stothers |
| 2012/0099616 A1 | 4/2012 | Penny et al. |

(Continued)

FOREIGN PATENT DOCUMENTS

| EP | 0680878 A1 | 11/1995 |
| GB | 2479943 A | 11/2011 |

OTHER PUBLICATIONS

Search Report issued in European Patent Application No. 22210025. 7; Application Filing Date Nov. 28, 2022; Date of Mailing May 3, 2023 (7 pages).

*Primary Examiner* — Joshua J Michener
*Assistant Examiner* — Ka Chun Leung
(74) *Attorney, Agent, or Firm* — CANTOR COLBURN LLP

(57) ABSTRACT

An electrothermal ice protection system (IPS) installed on an aircraft includes a sensor, a parting strip assembly, and a controller. The sensor monitors a direction of a local incident airflow that is imparted on the sensor. The parting strip assembly is coupled to the critical surface and includes a plurality of heating sections. The controller is in signal communication with the sensor and the parting strip assembly. The controller determines a direction of surface airflow incident on a critical surface of the aircraft based on the local incident airflow and selectively concentrates power to at least one targeted heating section among the plurality of heating sections with respect to non-targeted heating sections among the plurality of heating sections based on the direction of the surface airflow.

15 Claims, 8 Drawing Sheets

(56) References Cited

U.S. PATENT DOCUMENTS

| | | |
|---|---|---|
| 2017/0370960 A1 | 12/2017 | Benning et al. |
| 2018/0088238 A1 | 3/2018 | Garde et al. |
| 2020/0363445 A1 | 11/2020 | Sly et al. |
| 2022/0411079 A1* | 12/2022 | Stothers ................ B64D 15/20 |
| 2023/0166849 A1 | 6/2023 | Lopresto et al. |

* cited by examiner

ADJUSTABLE ICE PROTECTION SYSTEM PARTING STRIP

CROSS-REFERENCE TO RELATED APPLICATIONS

This application is a continuation of U.S. application Ser. No. 17/537,611 filed Nov. 30, 2021, the disclosure of which is incorporated herein by reference in its entirety.

TECHNICAL FIELD

The present disclosure relates to de-icing systems for aircraft, and more particularly, to aircraft electrothermal ice protection systems.

BACKGROUND

Aircrafts implement de-icing systems to remove ice accumulation on a critical surface of the aircraft such as for example, a wing, horizontal stabilizer, engine, pylons, and/or a blade to name a few surfaces. An example of an aircraft de-icing system includes an electrothermal ice protection system (IPS), which utilizes one or more high-watt density parting strips disposed at one or more ice stagnation areas of the critical surface.

The parting strips can be heated in response to receiving electrical current, thereby facilitating anti-icing (e.g., prevent the formation of ice) and/or removal of accumulated ice, ideally from an area of maximum dynamic pressure location on the leading edge of the critical surface. By removing the ice at the targeted location, aerodynamic forces realized by the critical surface during aircraft flight assists to remove or "shed" remaining portions of accumulated ice from locations of the critical surface farther aft, thereby allowing for a reduction of ice-removing electrothermal power (de-icing) and enhancing shedding performance in those other zones of ice protection.

SUMMARY

According to a non-limiting embodiment, an electrothermal ice protection system (IPS) installed on an aircraft includes a sensor, a parting strip assembly, and a controller. The sensor monitors a direction of a local incident airflow that is imparted on the sensor. The parting strip assembly is coupled to the critical surface and includes a plurality of heating sections. The controller is in signal communication with the sensor and the parting strip assembly. The controller determines a direction of surface airflow incident on a critical surface of the aircraft based on the local incident airflow and selectively concentrates power to at least one targeted heating section among the plurality of heating sections with respect to non-targeted heating sections among the plurality of heating sections based on the direction of the airflow.

According to another non-limiting embodiment, a parting strip assembly is configured to be installed at one or more critical surfaces of an aircraft. The parting strip assembly comprises a middle parting strip section, a lower parting strip section, and an upper parting strip section. The middle parting strip is configured to contact a middle portion of the critical surface, the lower parting strip section is configured to contact a lower portion of the critical surface, and the upper parting strip section is configured to an upper portion of the critical surface. The middle parting strip section, the lower parting strip section, and the upper parting strip section are activated in response to receiving a concentration of power, wherein the at least one middle parting strip section, the at least one lower parting strip section, and the at least one upper parting strip section are configured to be activated independently from one another.

According to yet another non-limiting embodiment, a method of de-icing a critical surface of an aircraft is provided. The method comprises determining a plurality of heating zones on a critical surface of the aircraft and coupling a parting strip to the critical surface such that a plurality of heating section of the parting strip correspond to the plurality of heating zones. The method further comprises monitoring, via a sensor, a direction of a local airflow imparted on the sensor and determining, via a controller, a direction of surface airflow incident on the critical surface based on the direction of the local airflow imparted on the sensor. The method further comprises selectively activating, via the controller, the plurality of heating sections independently from one another by concentrating electrical power to at least one targeted heating section among the plurality of heating sections with respect to non-targeted heating sections among the plurality of heating sections based on the direction of the airflow.

DESCRIPTION OF THE FIGURES

Certain embodiments of the present disclosure will now be described in greater detail by way of example only and with reference to the accompanying drawing in which.

DETAILED DESCRIPTIONS

Aircraft designers constantly seek design solutions to reduce electrical power needs on an aircraft. This goal becomes more important as aircraft designs increase the number of systems based on electricity. Ice protection is particularly important to the aircraft electrical design because the maximum power draw is high and is specifically needed in icing conditions which are encountered only during a fraction of the operating hours. A conventional electrical or electrical mechanical IPS utilizes a single strip at a fixed location, sometimes referred to as a "parting strip zone". The parting strip or multiple heaters are all energized together simultaneously so as to uniformly heat the parting strip zone, regardless as to the actual location of accumulated ice. Consequently, conventional IPS designs do not optimize power consumption.

Various non-limiting embodiments improve upon a conventional IPS by providing a parting strip assembly that includes multiple parting strips that define respective parting strip zones. One or more targeted parting strip zones can be heated independently from one another based on the angle of airflow with respect to the critical surface. Accordingly, a targeted parting strip zone can be selected to be heated and can dynamically change based on changes to the location of maximum dynamic pressure as it varies with aircraft angle of attack (AOA), the airspeed, the configuration of high-lift devices, and/or other parameters. Therefore, rather than heating the entire area of a critical surface disposed with parting strips as currently performed by a conventional electrothermal IPS, one or more non-limiting embodiments allows for selectively heating targeted parting strips without heating other parting strips, thereby providing an optimized electrothermal IPS capable of operating with improved power efficiency.

Figure 1:
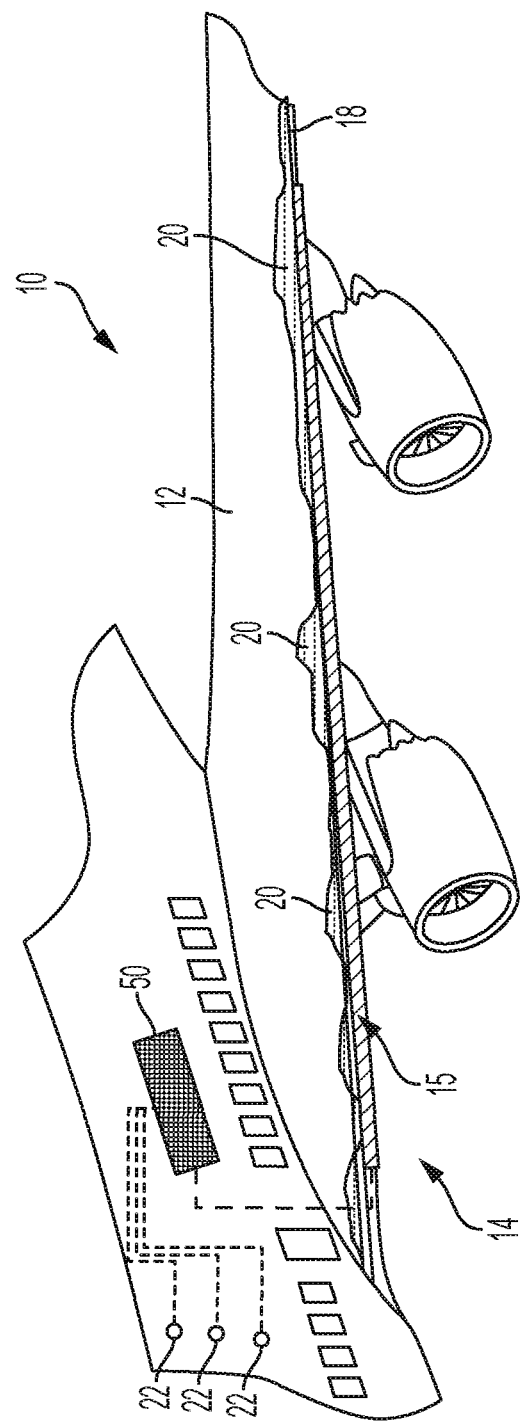
FIG. 1 is a schematic view of an aircraft equipped with an electrothermal ice protection system (IPS) according to a non-limiting embodiment.

With reference now to FIG. 1, an aircraft 10 equipped with an optimized electrothermal ice protection system (IPS) 14 is illustrated according to a non-limiting embodiment. The aircraft 10 includes a critical surface 12 that can be heated by the electrothermal IPS 14. Although the critical surface 12 is described going forward as a wing, for example, it should be appreciated that the critical surface may also include, but is not limited to, an airfoil, a blade or any curved leading edge surface.

The electrothermal IPS 14 includes one or more sensors 22, a parting strip assembly 15, and a controller 50. The electrothermal IPS 14 is configured to remove ice from a leading edge 18 of wing 12. In some embodiments, the electrothermal IPS 14 provides heat to leading edge 18 so as to melt ice accreted thereto. Although leading edge 18 of wing 12 is depicted as being ice free, due to the ice removal capability of the electrothermal IPS 14, ice accumulation 20 is shown at stagnation areas located aft of the electrothermal IPS 14.

The sensors 22 can perform various types of sensing functions and measurements including, but not limited to, temperature measurement, atmospheric pressure measurement, airflow speed measurement, and airflow direction measurement. In one or more non-limiting embodiments, the sensors 22 include a probe that extends out from the aircraft 10 (e.g., the side of the fuselage), thereby exposing the surface region to the atmosphere adjacent to the aircraft 10. Various technologies can be used to detect ice accumulation on the exposed sensors 22. For example, in some embodiments, a resonant probe can be used to detect ice accumulation upon these surface regions. The resonant probe can have a resonant frequency change that is indicative of ice accumulation upon the surface region of sensor 22 which correlates to ice accumulation on the critical surfaces of the aircraft 10. In some embodiments two adjacent conductors can be located on the surface regions of parting strip assembly 15 such that the conductors are exposed to the atmosphere adjacent to wing 12. When water or ice accretes on the surface region and spans two adjacent conductors, the conductivity therebetween can be indicative of such conditions. A temperature sensor located in proximity to the surface sensor can be used to differentiate between detection of water and ice.

In one or more non-limiting embodiments, the sensors 22 are configured to monitor a direction of incident airflow correlated to the direction of airflow incident on a critical surface 12 of the aircraft 10. The incidence travel can be described as the variation of the incidence along the critical surface 12 (e.g., wing) during flight of the aircraft 10. In some instances, during flight of the aircraft 10, airflow angles close to the surfaces of an aircraft 10 are affected by boundary layer effects and may not be the same as the true airflow angle of the aircraft 10 relative to free stream conditions.

Some sensors 22 may be capable of sensing what is known as a local AOA or local airflow angle (i.e., the airflow angle at the localized area of the sensor) but may not be capable of provide an accurate measurement of the local airflow angle at other critical locations on the aircraft 10. Therefore, an accurate determination of the local airflow angle at other critical locations on the aircraft may involve determining a correlation between the local sensed airflow angle and the local critical surface airflow angle. Accordingly, the sensors 22 can operate together with the controller to provide a local and specific information of the incidence. For instance, the airflow angle at the localized area of a sensor 22 can be delivered to the controller 50, which then determines a correlation (e.g., through arithmetic calculations and/or using a pre-determined look-up table stored in memory) between the local airflow angle and the direction of airflow incident on a critical surface 12 of the aircraft 10.

The electrothermal IPS 14, parting strip assembly 15, and sensors 22 are in signal communication with a controller 50. The controller 50 can control various operations of the electrothermal IPS 14. In one or more non-limiting embodiments, the controller 50 controls operation of the parting strip assembly 15 based on one or more signals provided by the sensors 22. For example, the controller can control a power supply (not depicted) to output electrical current to the parting strip assembly 15 based on a signal indicating ice accumulation detected by one or more of the sensors 22. In turn, the current induces the parting strip assembly 15 to emit heat, thereby melting the ice. One or more non-limiting embodiments, the sensors 22 can determine a direction of airflow with respect to wing 12. Based on the direction of the airflow, the controller 50 can activate a section of the parting strip assembly 15 to heat a targeted zone of the wing 12, while deactivating other sections of the parting strip assembly 15. In this manner, the power efficiency of the electrothermal IPS 14 can be improved as described in greater detail below.

Figure 2:
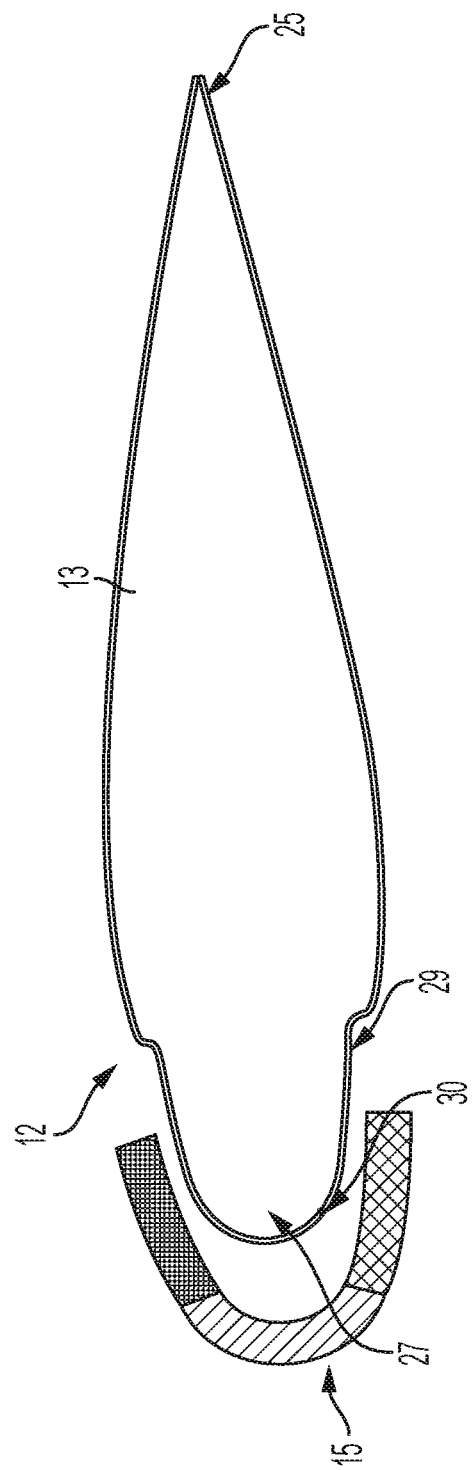
FIG. 2 is an exploded view of a parting strip assembly including an electrothermal IPS according to a non-limiting embodiment.
Figure 3:
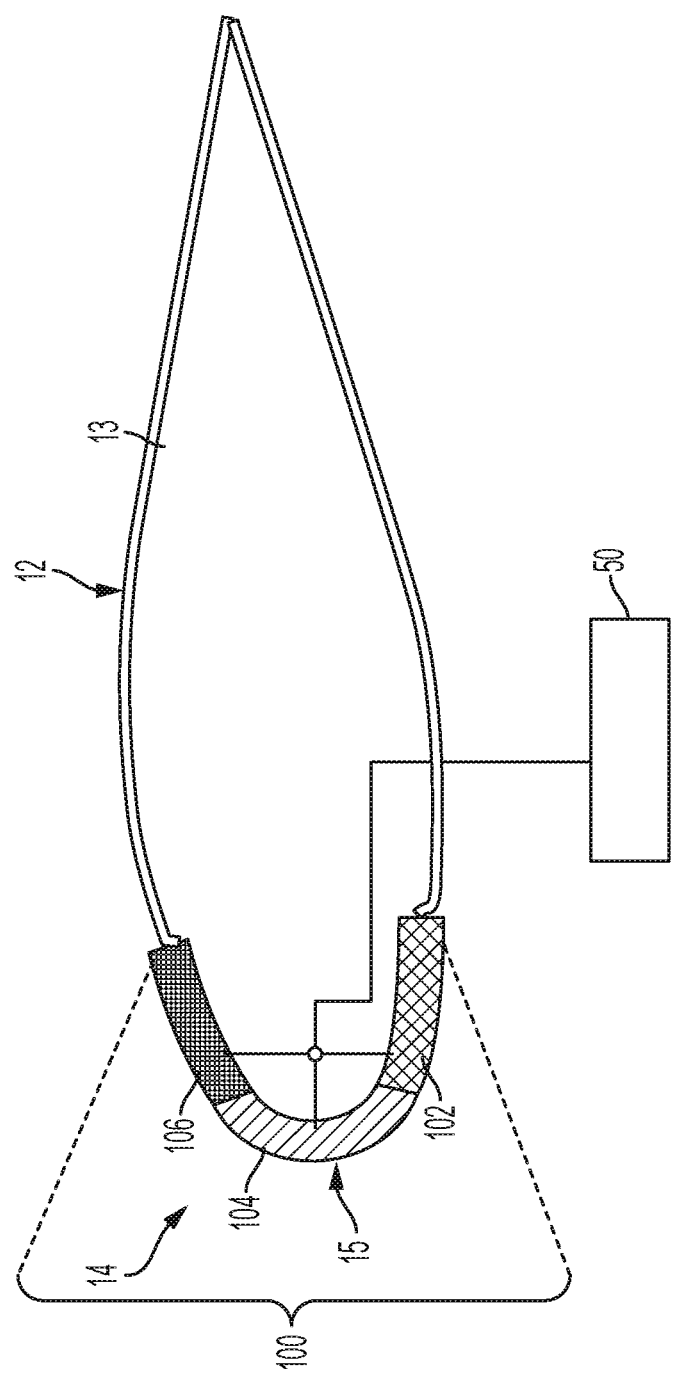
FIG. 3 is an assembled view of the parting strip assembly illustrated in FIG. 2.

FIGS. 2 and 3 collectively illustrate a parting strip assembly 15 capable of heating a critical surface such as wing 12, for example, according to a non-limiting embodiment. The wing 12 has a main body 13 extending between a trailing edge 25 and a leading edge 27. In one or more non-limiting embodiments, the main body 13 has a recess 29 can be formed gradually by tapering, or can alternatively be formed by a step in the reduction of thickness.

The parting strip assembly 15 is configured to be disposed against an outer surface 30 of the leading edge 27 of the wing 12. In one or more non-limiting embodiments, the parting strip assembly 15 can be sized and shaped so that it fits snugly within this recessed section 29 of the main body 13. In one or more non-limiting embodiments, the outer surface of the parting strip assembly 15 is flush with the outer surface 30 of the wing 12 so that the surfaces are flush with each other and there is no step between their outer surfaces.

The parting strip assembly 15 covers at least part of the leading edge 27 of the wing 12. In one or more non-limiting embodiments, the part of the wing 12 covered by the parting strip assembly 15 can include an expected ice stagnation area. In one or more non-limiting embodiments, the parting strip assembly 15 covers the upper surface, middle surface and lower surface of the wing 12 to define a heating zone 100 as shown in FIG. 3. In some examples, the parting strip assembly 15 includes one or more parting strips, where each parting strip serves as a heating element. In one or more non-limiting embodiments, the parting strips are embedded in a resin or other matrix that provides anti-erosion protection and also serves as a thermal insulation layer. According to at least one non-limiting embodiment, one or more of the parting strips include a strip of metallic foil that is resistive and generates heat when connected to an electric power supply by the Joule Effect. Other heating elements and matrices, however, can be employed without departing from the scope of the invention.

With continued reference to FIGS. 2 and 3, the parting strip assembly 15 includes a plurality of individual parting strip sections. In the example illustrated in FIGS. 2 and 3, the parting strip assembly 15 includes a lower parting strip section 102, a middle parting strip section 104, and an upper parting strip section 106. It should be appreciated, however, that more or less parting strip sections can be employed without departing from the scope of the invention. The lower parting strip section 102 can define a lower heating zone, the middle parting strip section 104 can define a middle heating zone, and the upper parting strip section 106 can define an upper heating zone.

The lower parting strip section 102, middle parting strip section 104, and upper parting strip section 106 are in signal communication with the controller 50 and each can be independently activated and deactivated with respect to one another. In one or more non-limiting embodiments, a given parting strip section 102, 104 106 can be activated by concentrating power to the given section given section 102, 104 106. For example, the controller 50 can activate the middle parting strip section 104 without activating the lower parting strip section 102 and the upper parting strip section 106. In other scenarios, the controller 50 can activate a combination of the parting strip sections 102, 104 and 106. For example, the controller 50 can activate the lower parting strip section 102 and the middle parting strip section 104 without activating the upper parting strip section 106. If necessary, the controller 50 can activate all of the lower parting strip section 102, the middle parting strip section 104, and the upper parting strip section 106 simultaneously.

In one or more non-limiting embodiments, the controller 50 can provide a higher power level to one parting strip section 102, 104, 106, while providing a lower power level to one or more of the other parting strip sections 102, 104, 106. In addition, the controller 50 can adjust the power levels (e.g., the power density) for a given parting strip section 102, 104, 106 based on the local AOA at the parting strip, while one or more targeted parting strip sections 102, 104, 106 to be controlled (e.g., thermally adjusted) for power optimization. The range of incident airflow angles over the flight envelope of the aircraft is used to locate and size the different parting strips.

Figure 4A:
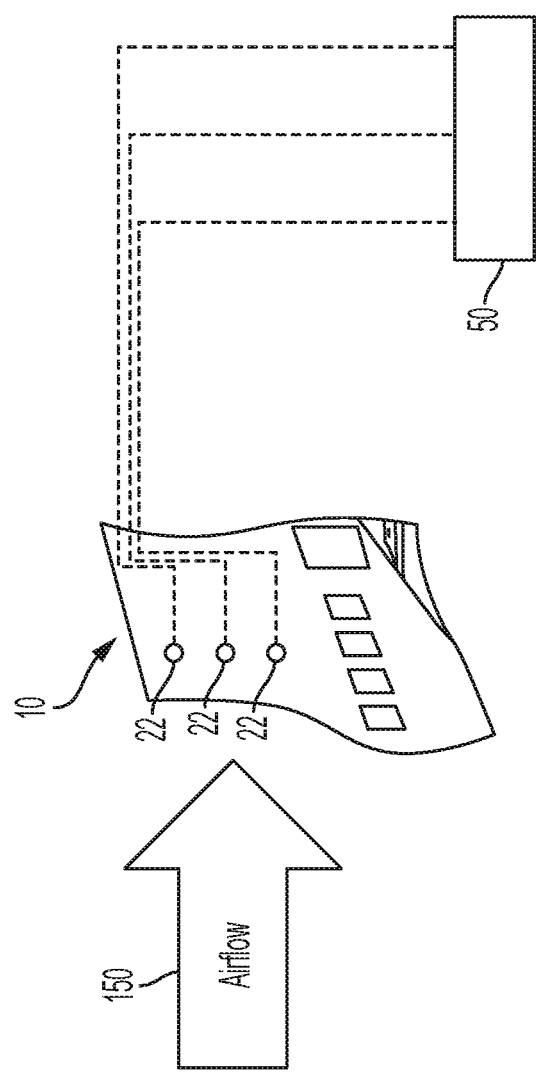
FIGS. 4A and 4B illustrate the parting strip assembly heating a first target parting strip zone in response to receiving airflow in a first direction according to a non-limiting embodiment.
Figure 4B:
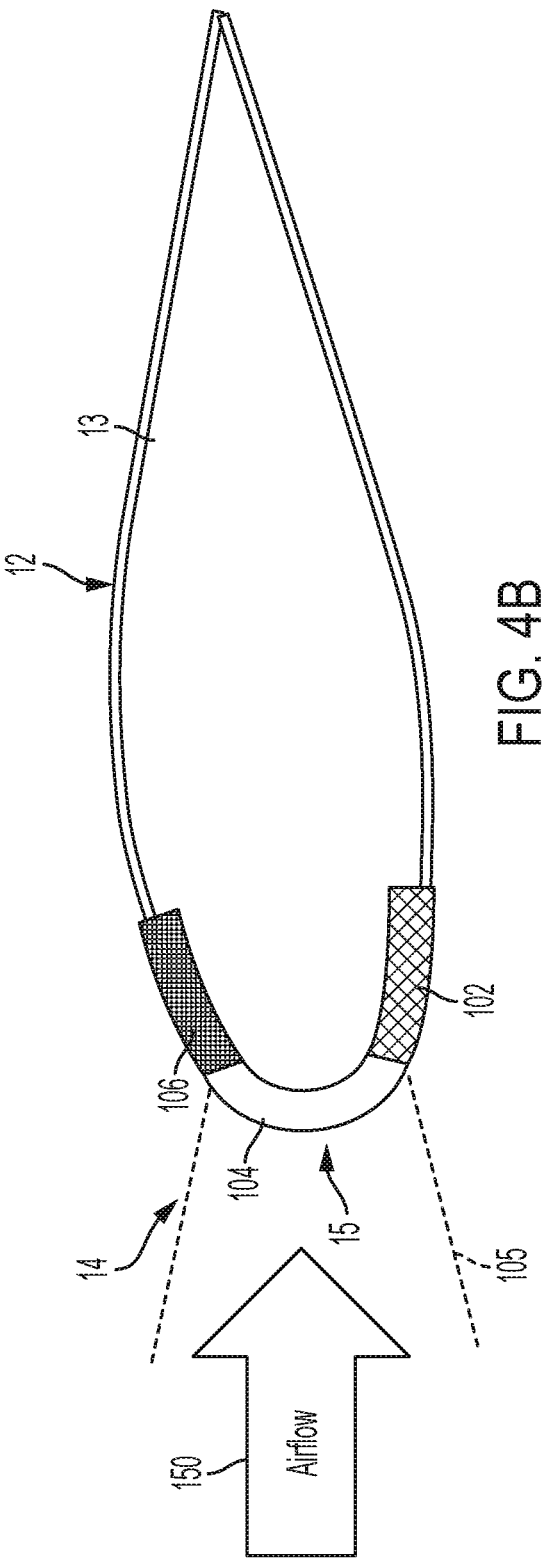

Turning now to FIGS. 4A and 4B, the parting strip assembly 15 is illustrated heating a middle heating zone 105 in response to detecting airflow 150 incident to the wing 12 at a first direction (e.g., in a forward direction) according to a non-limiting embodiment. As described herein, one or more sensors 22 can detect the direction of the airflow 150 with respect to the wing 12. Accordingly, the controller 50 can receive the output signal from the sensor 22 to determine the direction of the airflow 150 at any given moment during the flight of the aircraft.

The forward direction of the airflow 150 incident on the middle of the middle area of the wing 12 is often the area of maximum dynamic pressure during typical flight conditions of an aircraft. Accordingly, the middle heating zone 105 is determined to be the optimum zone to be heated based on the current location of maximum dynamic pressure applied by the airflow 150. As described herein, the controller 50 can selectively heat the middle heating zone 105 by activating the middle parting strip section 104 (e.g., by delivering electrical current to the middle parting strip section 104) while deactivating the lower parting strip section 102 and the upper parting strip section 106 (e.g., by refraining from delivering current to the lower and upper parting strip sections 102 and 106).

Figure 5A:
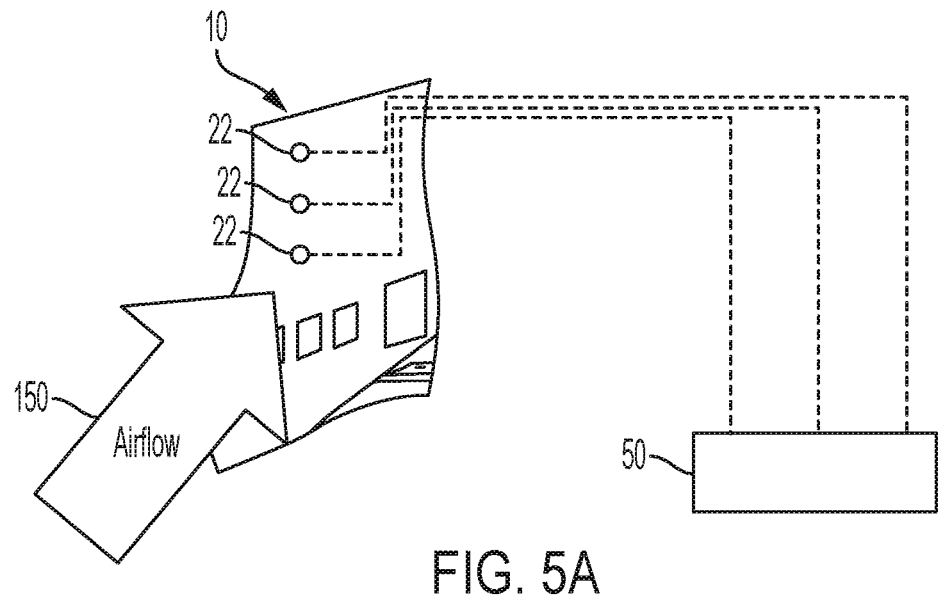
FIGS. 5A and 5B illustrates the parting strip assembly heating a second target parting strip zone in response to receiving airflow in a second direction according to a non-limiting embodiment.
Figure 5B:
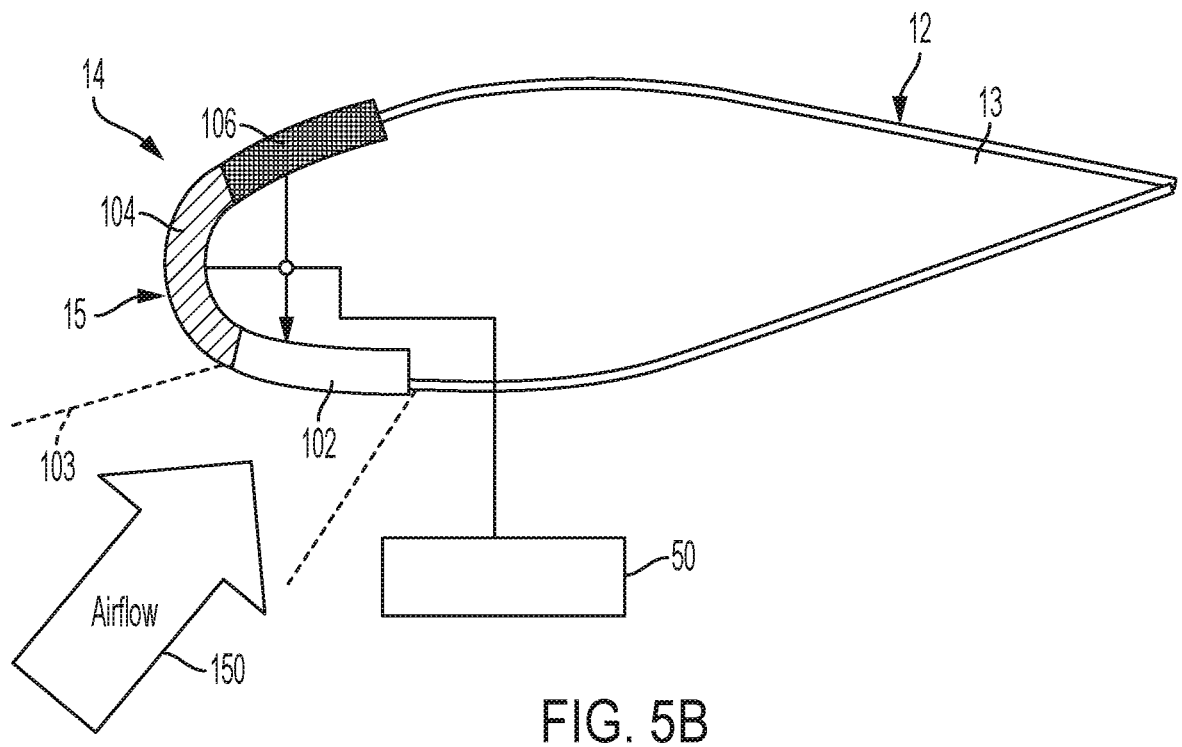

Referring to FIGS. 5A and 5B, the parting strip assembly 15 is illustrated heating the lower heating zone 103 in response to detecting airflow 150 incident to the wing 12 at a second direction (e.g., in an upward direction) according to a non-limiting embodiment. In one or more non-limiting embodiments, the direction of the airflow 150 actively changes from the forward direction shown in FIGS. 4A and 4B to the upward direction 150 shown in FIG. 5 during the flight of the aircraft. This scenario is typical during a "hold condition" or during descent and/or landing events. Accordingly, the location of maximum dynamic pressure moves to a lower location on the wing 12.

In response to the upward direction of the airflow 150, the controller can dynamically determine that the optimum zone to be heated is the lower heating zone 103. In this manner, the controller can dynamically stop heating the middle heating zone 105 by deactivating the middle parting strip section 104 (e.g., stopping current flow thereto), and initiate heating of the lower heating zone 103 by activating the lower parting strip section 102 (e.g., delivering current flow thereto), while deactivating the middle parting strip section 104 and the upper parting strip section 106 (e.g., by refraining from delivering current to the middle and upper parting strip sections 104 and 106).

Figure 6A:
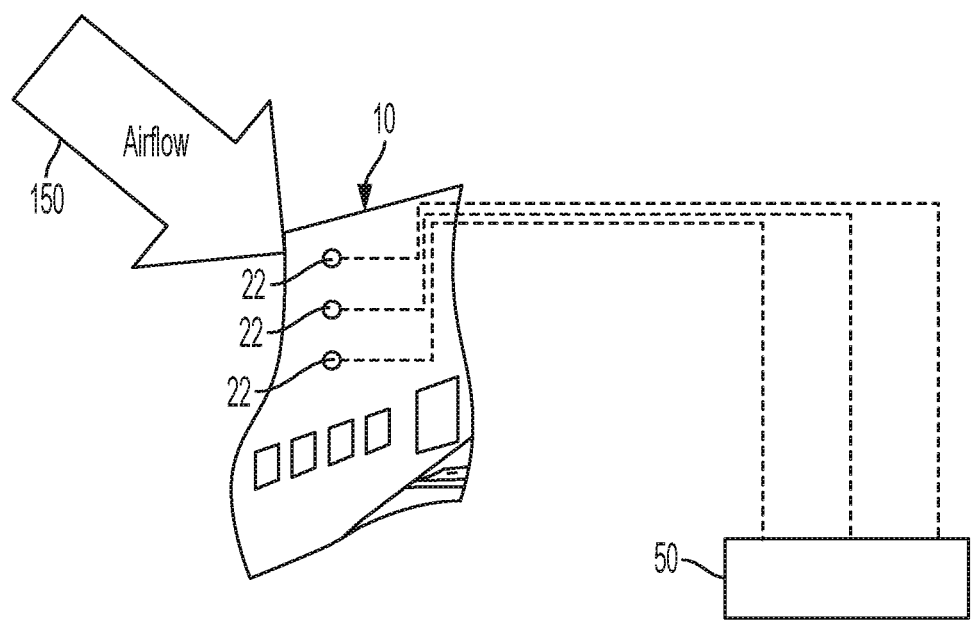
FIGS. 6A and 6B illustrates the parting strip assembly heating a first target parting strip zone in response to receiving airflow in a third direction according to a non-limiting embodiment.
Figure 6B:
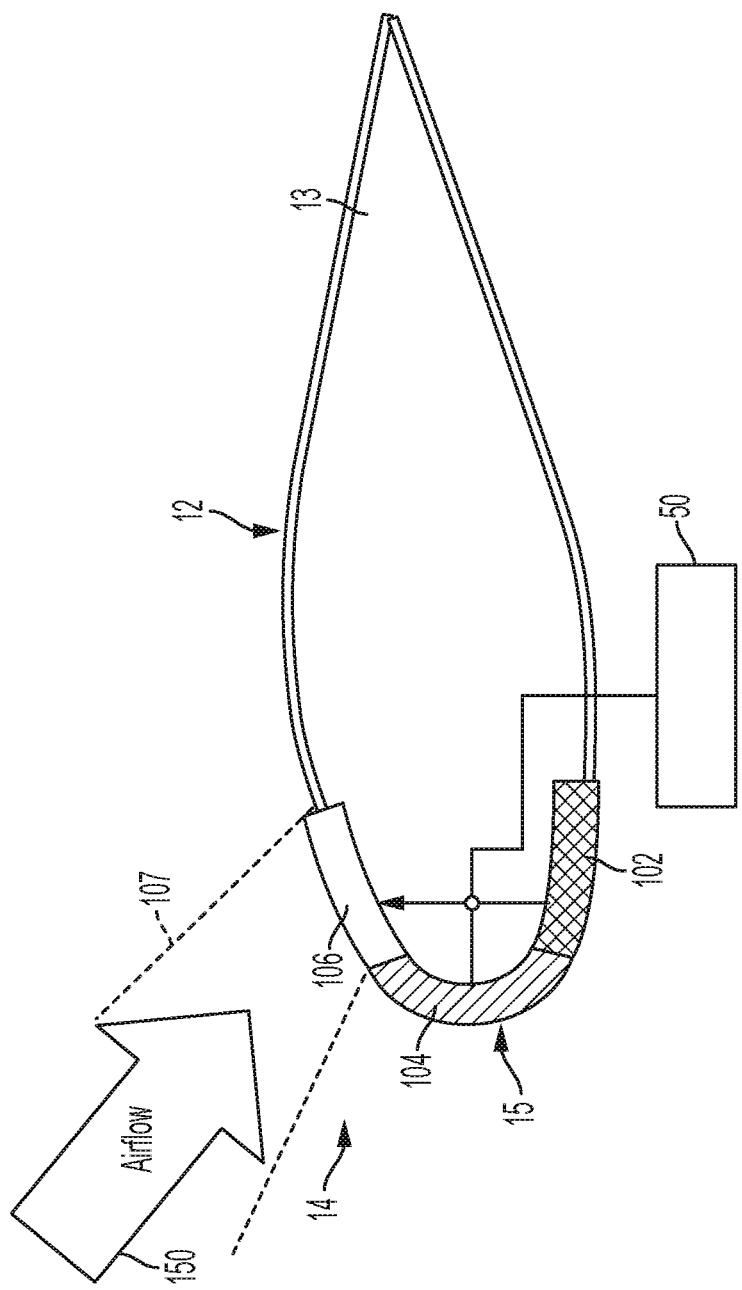

Turning to FIGS. 6A and 6B, the parting strip assembly 15 is illustrated heating the upper heating zone 107 in response to detecting airflow 150 incident to the wing 12 at a third direction (e.g., in a downward direction) according to a non-limiting embodiment. In one or more non-limiting embodiments, the direction of the airflow 150 actively changes direction (e.g., from the forward direction shown in FIGS. 4A and 4B) to the downward direction 150 shown in FIGS. 6A and 6B during the flight of the aircraft. This scenario is typical during a descent. Accordingly, the location of maximum dynamic pressure moves to an upper location on the wing 12.

In response to the downward direction of the airflow 150, the controller 50 can dynamically determine that the optimum zone to be heated is the upper heating zone 107. In this manner, the controller 50 can dynamically initiate heating of the upper heating zone 107 by activating the upper parting strip section 106 (e.g., delivering current flow thereto), while deactivating the lower parting strip section 102 and the middle parting strip section 104 (e.g., by refraining from delivering current to the lower and middle parting strip sections 102 and 104).

Figure 7:
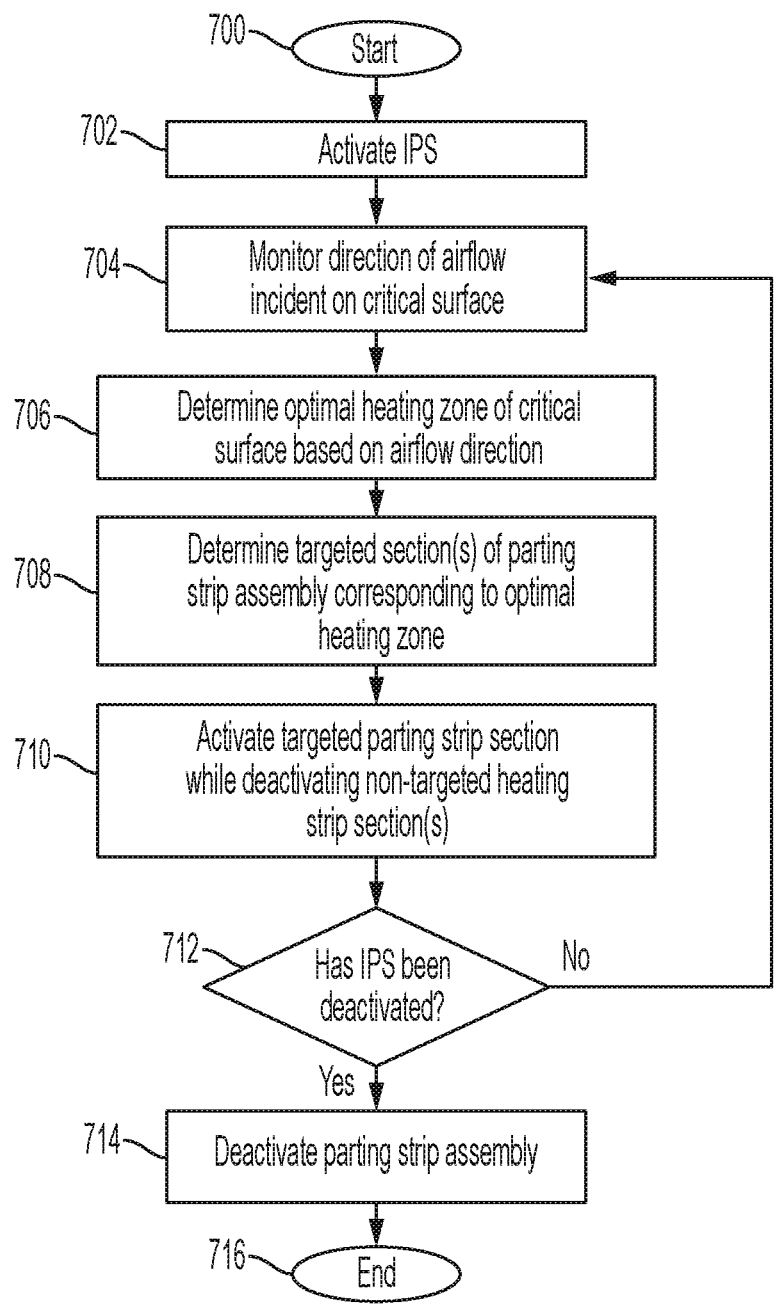
FIG. 7 is a flow diagram illustrating a method of de-icing a critical surface of an aircraft according to a non-limiting embodiment.

With reference now to FIG. 7, a method of de-icing a critical surface of an aircraft is illustrated according to a non-limiting embodiment. The method begins at operation 700, and at operation 702 an electrothermal IPS installed on an aircraft is activated. At operation 704, a direction of airflow incident on a critical surface of an aircraft is monitored. The critical surface can include, but is not limited to, a wing, airfoil, and/or a blade. At operation 706, an optimal heating zone of the critical surface is determined based on the direction of the airflow. At operation 708, one or more targeted sections of a parting strip assembly are determined based on the optimal heating zone. At operation 710, the targeted section(s) of the parting strip assembly are activated while non-targeted sections of the parting strip assembly are de-activated or reduced in power. Accordingly, the optimal heating zone is heating using the activated sections of the parting strip assembly. At operation 712, a determination is made as to whether the electrothermal IPS has been deactivated. When the electrothermal IPS has been deactivated, the parting strip assembly is deactivated at operation 714 (e.g., current is halted to the targeted sections of the parting strip assembly), and the method ends at operation 716.

When, however, the electrothermal IPS is not deactivated, the method returns to operation 704 and continues monitoring the direction of the airflow incident on the critical surface. It is typical for the aircraft to change direction, thus dynamically changing the direction of the airflow incident on the critical surface as described herein. For example, the direction of the airflow may change from a forward direction to an upward direction as the aircraft transitions from a cruise flight phase to a climb flight phase. When a change in the direction of the airflow is determined at operation 704, a new optimal heating zone can be determined at operation 706, and one or more different targeted sections of the parting strip assembly can be dynamically activated based on the newly determined optimal heating zone. Accordingly, the new targeted sections of the parting strip can be activated to account for the change in the airflow direction, and the method continues to operation 712 as described above.

As descried herein, various non-limiting embodiments of the present disclosure provides an electrothermal IPS capable of determining optimum heating zones, and in response selectively activating sections of a parting strip assembly as the location of maximum dynamic pressure varies with aircraft angle of attack (AOA), airspeed, configuration of high-lift devices, or other parameters. In this manner, the electrothermal IPS facilitates optimized heating efficiency while reducing overall power consumption during the flight of the aircraft.

What is claimed is:

1. An electrothermal ice protection system (IPS) installed on an aircraft, the electrothermal IPS comprising:
   a sensor configured to monitor a direction of a local incident airflow imparted on the sensor;
   a parting strip assembly coupled to a critical surface of the aircraft, the parting strip assembly including a plurality of heating sections; and
   a controller in signal communication with the sensor and the parting strip assembly, the controller configured to determine a direction of surface airflow incident on the critical surface of the aircraft based on the local incident airflow, and to selectively concentrate power to at least one targeted heating section among the plurality of heating sections with respect to non-targeted heating sections among the plurality of heating sections based on the direction of the surface airflow,
   wherein the controller determines an optimal heating zone of the critical surface based on one or both of the direction of the surface airflow and an ice stagnation area of the critical surface, and delivers a first level of power to the at least one targeted heating section to heat the optimal heating zone while outputting a second level of power less than the first level of power to at least one of the non-targeted heating sections.

2. The electrothermal IPS of claim 1, wherein the plurality of heating sections comprises:
   at least one middle parting strip section contacting a middle portion of the critical surface;
   at least one lower parting strip section contacting a lower portion of the critical surface; and
   at least one upper parting strip section contacting an upper portion of the critical surface.

3. The electrothermal IPS of claim 2, wherein the controller activates one or more of the at least one middle parting strip section, the at least one lower parting strip section, and the at least one upper parting strip section, while deactivating at least one of the remaining middle parting strip section, remaining lower parting strip section, and remaining upper parting strip section based on the direction of the surface airflow.

4. The electrothermal IPS of claim 3, wherein the controller activates the at least one middle parting strip section, while deactivating at least one of the remaining lower parting strip section and the remaining upper parting strip section in response to detecting the surface airflow incident on the middle portion of the critical surface.

5. The electrothermal IPS of claim 3, wherein the controller activates the at least one lower parting strip section, while deactivating at least one of the remaining middle parting strip section and the remaining upper parting strip section in response to detecting the surface airflow incident on the lower portion of the critical surface.

6. The electrothermal IPS of claim 3, wherein the controller activates the at least one upper parting strip section, while deactivating at least one of the remaining middle parting strip section and the remaining lower parting strip section in response to detecting the surface airflow incident on the upper portion of the critical surface.

7. The electrothermal IPS of claim 1, wherein the controller controls output of electrical current to the at least one targeted heating section to concentrate the power at the at least one targeted heating section, while blocking output of electrical current to the at least one of the non-targeted heating sections to deactivate the at least one non-targeted heating sections.

8. A method of de-icing an aircraft, the method comprising:
   determining a plurality of heating zones on a critical surface of the aircraft and coupling a parting strip to the critical surface such that a plurality of heating section of the parting strip correspond to the plurality of heating zones;
   monitoring, via a sensor, a direction of a local airflow imparted on the sensor; and
   determining, via a controller, a direction of a surface airflow incident on the critical surface based on the direction of the local airflow imparted on the sensor; and
   selectively activating, via the controller, the plurality of heating sections independently from one another by concentrating electrical power to at least one targeted heating section among the plurality of heating sections with respect to non-targeted heating sections among the plurality of heating sections based on the direction of the surface airflow.

9. The method of claim 8, wherein selectively activating the plurality of heating sections independently from one another further comprises:
   determining an optimal heating zone of the critical surface based on the direction of the surface airflow and a stagnation location.

10. The method of claim 9, wherein selectively activating the plurality of heating sections independently from one another further comprises activating the at least one targeted heating section to heat the optimal heating zone while deactivating or providing lower power to at least one of the non-targeted heating sections.

11. The method of claim 10, wherein selectively activating the plurality of heating sections independently from one another further comprises:
activating one or more of at least one middle parting strip section, at least one lower parting strip section, and at least one upper parting strip section, while deactivating at least one of a remaining middle parting strip section, a remaining lower parting strip section, and a remaining upper parting strip section based on the direction of the surface airflow.

12. The method of claim 11, wherein selectively activating the plurality of heating sections independently from one another further comprises:
activating the middle parting strip section, while deactivating the remaining lower parting strip section and the remaining upper parting strip section in response to determining the surface airflow incident on the middle portion of the critical surface.

13. The method of claim 11, wherein selectively activating the plurality of heating sections independently from one another further comprises:
activating the lower parting strip section, while deactivating the remaining middle parting strip section and the remaining upper parting strip section in response to determining the surface airflow incident on the lower portion of the critical surface.

14. The method of claim 11, wherein selectively activating the plurality of heating sections independently from one another further comprises:
activating the upper parting strip section, while deactivating the remaining middle parting strip section and the remaining lower parting strip section in response to determining the surface airflow incident on the upper portion of the critical surface.

15. The method of claim 10, wherein selectively activating the plurality of heating sections independently from one another further comprises outputting, via a controller, electrical current to the at least one targeted heating section to concentrate the power at the at least one targeted heating section, while blocking output of electrical current to the at least one of the non-targeted heating sections to deactivate the at least one non-targeted heating sections.

\* \* \* \* \*